3,150,992
CALCIUM-ALUMINATE CEMENT
AND METHOD
Michael S. Crowley, Chicago Heights, Ill., assignor to Standard Oil Company, Chicago, Ill., a corporation of Indiana
No Drawing. Filed Jan. 16, 1961, Ser. No. 82,715
6 Claims. (Cl. 106—104)

This invention relates to calcium-aluminate base cement products and a method of increasing the strength of such materials. Still more particularly this invention relates to an improved calcium-aluminate concrete containing calcium orthophosphate.

There are many applications of concrete in petroleum refineries, steel mills and other industrial installations where refractory concrete is subjected to severe service conditions. Typical of such applications are certain petroleum processing units wherein the concrete is exposed to high temperature gases moving at high velocities and carrying entrained catalyst particles. Under such conditions the concrete is often eroded away rapidly, requiring considerable maintenance expenses. It is known that the erosion resistances of refractory castables vary as a rough function of their compressive strengths, and that the high strength materials usually have a much greater erosion resistance than similar lower strengh materials. Hence, it is desirable to achieve the highest possible strength in concretes used for these purposes.

Calcium-aluminate cement base concretes are widely used in applications as mentioned above. These concretes are noted for their high strengths, especially after being fired at around 1000° F. Typically, these concretes consist of calcium-aluminate cement, and an aggregate which are mixed, with water added to proper consistency for tamping or gunning into place. After curing and firing at elevated temperatures, usually around 1000° F., such concretes may have compressive strengths as high as about 14,000 p.s.i. However, if the strengths of such concretes were increased this would allow the service life of the concretes to be extended even further than that presently obtained when exposed to highly erosive gases or other applications where high strengths are desirable.

Calcium-aluminate cement is a hydraulic cement, i.e., a water setting cement which cures by hydration, rather than a heat setting cement which is fused at a high temperature. As mentioned above, firing further increases the strength of the cured cement composition. Commercial calcium-aluminate cement is sometimes referred to as aluminous or high-alumina cement because the forms of calcium-aluminate most generally used in cement compositions have an alumina to calcium oxide molar ratio of at least about 1:1, e.g., $CaO \cdot Al_2O_3$.

Phosphate bonded cements, such as alumina and silica base cements, are well known, as well as phosphoric acid bonded calcium-aluminate cements. In these materials relatively large amounts of phosphate ion are employed to effect a bonding action and the materials are heat setting rather than hydraulic setting. Firing at an elevated temperature is required to effect a bond. The use of phosphoric acid in these latter materials presents considerable problems related to the safety of personnel handling the material.

Surprisingly, the incorporation of small amounts of calcium orthophosphate in calcium-aluminate cement base compositions has been found to significantly improve the fired strength of these materials. The exact mechanism which is responsible for the strength increase in the compositions of the invention is not known. However, several explanations can be offered concerning the strength increase: (1) the calcium phosphate may tend to catalyze a phase change during hydration, (2) the phosphate may combine with free alumina from the cement or the aggregate to form the quartz structure derivative $AlPO_4$, probably at a temperature of above about 528° F., (3) alumina may react with free calcium in the additive to form an interstitial phase which increases the cementitious power of the cement, (4) more extensive crystallization or better formed crystals or atomic networks because of the presence of the additive.

The compositions of the present invention employ a relatively small amount of calcium orthophosphate, i.e., less than about 10 weight percent of dicalcium phosphate, in a high-alumina calcium-aluminate cement base composition to effect a very significant increase in the fired strength of the product. In a preferred form of the invention about 0.5 wight percent to about 3 weight percent of dicalcium phosphate ($CaHPO_4 \cdot nH_2O$) is added to a pure high-alumina calcium-aluminate alumina aggregate concrete to effect an increase in the fired concrete strength from about 14,000 p.s.i. to about 20,000 p.s.i. or more.

The calcium-aluminate component employed in the present invention is a high-alumina calcium-aluminate which may be a naturally occurring mineral, but preferably is a synthetic composition such as commercially available calcium-aluminate, generally made by firing bauxite and limestone together at high temperatures. The calcium-aluminate has an alumina to calcium oxide molar ratio in the range of about 1:1 ($CaO \cdot Al_2O_3$) to about 6:1 ($CaO \cdot 6Al_2O_3$), so that the cement is hydraulic setting. Optimally, the alumina to calcium oxide molar ratio is in the range of 2:1 to 3:1, and preferably $$CaO \cdot 2.5Al_2O_3$$

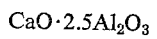

is employed. Pure calcium-aluminate cement has been found to be much more effective in increasing the fired strength than the impure varieties of calcium-aluminate which contain compounds of iron, silica, etc.

Advantageously, an alumina aggregate is employed in the compositions of the present invention to obtain the desired increase in concrete strength. Preferably the alumina is of the highly calcined variety commercially referred to as tabular alumina. Other aluminous aggregates, containing at least 50 weight percent $Al_2O_3$ with the balance being an alumino-silicate such as calcined clay or crushed brick, may be employed.

Three calcium orthophosphates are generally recognized. These are monocalcium phosphate $$(Ca(H_2PO_4)_2)$$

dicalcium phosphate ($CaHPO_4$), and tricalcium phosphate ($Ca_3(PO_4)_2$). The orthophosphates may exist in varying degrees of hydration, depending upon the method of preparation. The calcium orthophosphates are available commercially and their preparation need not be described herein. It is preferred to incorporate small amounts of dicalcium phosphate of the form $$CaHPO_4 \cdot nH_2O$$

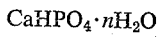

in the compositions of the invention since it has been found that this additive is remarkably more effective in increasing the fired concrete strength than mono- or tricalcium phosphate. The amount of dicalcium phosphate employed in the mix during the preparation of the compositions of the invention desirably is about 0.25 weight percent to about 6 weight percent, based upon the total weight of the other solids in the mix, with about 0.5 weight percent to about 3 weight percent being more advantageous. Preferably, however, about 1 weight percent to 2 weight percent of dicalcium phosphate is incorporated in the mix to effect a maximum increase in strength.

For example, it has been observed in testing concretes containing varying amounts of dicalcium phosphate that the compressive strengths, after firing at 1000° F., increased rapidly between 0% and about 2% phosphate to a maximum, and then decreased steadily with larger additions of phosphate up to about 10%.

The particle size distribution of the cement and the aggregate can vary over a considerable range, so long as this is consistent with sound concrete technology. Preferably a bi-modal particle size distribution is employed to obtain the most advantageous particle packing. For example, in one particular mix, prepared according to the invention with $CaO \cdot 2.5Al_2O_3$ and pure alumina, the particle size distribution was as follows:

|  | Percent |  |
|---|---|---|
| —4 mesh | 0 | |
| —4 +8 mesh | 17.2 | |
| —8 +14 mesh | 37.3 | Primarily aggregate |
| —14 +28 mesh | 15.8 | |
| —28 +48 mesh | 7.3 | |
| —48 +100 mesh | 5.1 | |
| —100 +200 mesh | 4.6 | |
| —200 +325 mesh | 5.1 | Primarily cement |
| —325 | 8.3 | |

In a preferred embodiment of the invention a dry mix is prepared of pure high-alumina calcium-aluminate, tabular alumina aggregate and dicalcium phosphate. These materials are blended uniformly and just sufficient water is added to form a tamping consistency. Preferably the amount of water employed is about 10%, based on the weight of the dry mix, since excessive water causes a decrease in the strength of the concrete. However, varying amounts of water may be employed, with the selected proportion being determined by the conditions under which application of the present cement product is made. The compositions of the present invention have been found to be suitable for use either by tamping or by gunning in place. Typically, the calcium-aluminate cement may constitute about 5 to 35 weight percent of the dry mix, with the alumina aggregate constituting about 65 to 95 weight percent. Advantageously, the calcium-aluminate cement constitutes about 12 to 25% of the dry mix, with the aggregate constituting about 75 to 88 weight percent. In practice it has been found most preferable to employ a dry mix containing about 18 weight percent calcium-aluminate and about 82 weight percent aggregate, with about 10% water being added to form the wet mix.

As mentioned above, the calcium orthophosphate preferably is incorporated in the mix in the form of dry particles, however, it is contemplated that the calcium orthophosphate may also be added in solution form to either the dry mix or the wet mix.

After placing the wet mix prepared as described above, it is allowed to hydrate or cure, according to normal refractory concrete practice. During the curing period water for hydration may be retained by using a membrane, water, damp cloth or the like, in order to obtain the most desirable properties in the final product. The compositions of the present invention usually hydrate in about 6 to 12 hours, with about 24 hours being the normal curing time. Of course, the curing time required for a particular concrete will vary according to composition.

After curing, the concrete is subjected to an elevated temperature to effect a very significant increase in strength. The firing time and temperature will vary considerably according to the particular mix employed and the mass applied. Normally the cured concrete is fired overnight, however, lesser periods of time may be justified in particular applications. While low temperature firing, i.e., about 220° F., has been found to result in some improvement in the fired strength of the concrete, it is the practice generally to fire the concrete in a temperature range of about 525° to 2000° F., preferably at about 600° to 1500° F. Firing at higher temperatures may be employed, but generally this results in a decrease in the fired strength of the concrete. It is understood that the firing as described herein may be accomplished after the concrete product is placed in service, as well as before placing the material in service.

To illustrate the improved properties obtainable with the preferred compositions of the present invention the following examples are given:

I

A high-alumina calcium-aluminate mix containing about 18 weight percent pure $CaO \cdot 2.5Al_2O_3$ and about 82 weight percent tabular alumina (substantially pure $Al_2O_3$) was intimately blended with varying amounts of dry $CaHPO_4 \cdot 2H_2O$. About 10% water, based on the weight of the dry mix, was added and a wet mix was formed. The mix was allowed to damp cure for about 24 hours and the cured product was then fired overnight at a temperature of about 1000° F. The compressive strengths of 2″ cubes of the fired concrete were determined. At 0% dicalcium phosphate the compressive strength was about 14,000 p.s.i.; at 1%, about 17,000 p.s.i.; at 2%, about 20,000 p.s.i.; at 3%, about 19,000 p.s.i. and at 10%, about 14,000 p.s.i.

II

A series of mixes were prepared and cured as described above except that the concretes were fired at about 220° F. At 0% phosphate the compressive strength was about 12,000 p.s.i.; at 1% about 13,000 p.s.i.; and at 3%, about 13,500 p.s.i.

III

A composition was prepared and cured as described above except that it contained about 1% dicalcium phosphate. This material was then fired at about 600° F. An increase in fired strength from 14,400 p.s.i. to 17,000 p.s.i. was observed.

From the foregoing examples it is readily seen that a remarkable increase in the strength of fired calcium-aluminate cement base compositions is obtained by incorporating relatively small amounts of dicalcium phosphate in the compositions.

While the invention has been described above with reference to preferred and particular embodiments thereof, it is to be understood that various alternatives will become apparent to the skilled artisan from a reading of the foregoing description. Such alternatives will fall within the spirit and scope of the present invention.

Having described my invention, what I claim is:

1. A refractory mix which consists essentially of about 5 to 35 weight percent calcium aluminate having an alumina to calcium oxide molar ratio between about 3:1 to 2:1; about 65 to 95 weight percent alumina aggregate; and about 0.25 to 6 percent, based on the combined weights of said calcium aluminate and said alumina, of $CaHPO_4$.

2. A refractory mix which consists essentially of about 12 to 25 weight percent of essentially pure calcium aluminate cement having an alumina to calcium oxide molar ratio of 2.5:1, about 75 to 88 weight percent tabular alumina aggregate; and about 0.5 to 3 percent, based on the combined weights of said calcium aluminate and said alumina, of $CaHPO_4$.

3. In the manufacture of calcium aluminate base refractory cement compositions, the method which comprises preparing a mix consisting essentially of pure calcium aluminate cement having an alumina to calcium oxide molar ratio between about 2:1 and about 3:1, an alumina aggregate, about 0.25 to about 6 percent, based on the combined weights of said calcium aluminate and said aggregate, of $CaHPO_4$, and water; curing said mix; and firing said cured composition at a temperature between about 600° F. and about 1500° F. to effect an increase in the strength of said composition.

4. The method of claim 3 wherein said alumina is a highly calcined alumina.

5. The method of claim 3 wherein said $CaHPO_4$ is present in an amount between about 0.5 and about 3 percent, based on the combined weights of said calcium aluminate and said aggregate.

6. The method of claim 3 wherein said mix consists essentially of about 12 to 25 weight percent pure calcium aluminate having an alumina to calcium oxide molar ratio of 2.5:1, about 75 to 88 weight percent of a tabular alumina aggregate, about 0.5 to 3 percent, based on the combined weights of said calcium aluminate and said aggregate, of $CaHPO_4$, and about 10 percent water, based upon the weight of dry ingredients of the mix.

References Cited in the file of this patent

UNITED STATES PATENTS

| | | |
|---|---|---|
| 2,391,493 | Wainer et al. | Dec. 25, 1945 |
| 2,419,290 | Schaefer | Apr. 22, 1947 |
| 2,829,063 | Schwartzwalder et al. | Apr. 1, 1958 |
| 2,852,401 | Hansen | Sept. 16, 1958 |
| 2,859,124 | King | Nov. 4, 1958 |
| 2,912,341 | Ricker | Nov. 10, 1959 |
| 2,965,506 | Ueltz | Dec. 20, 1960 |